(12) United States Patent
Reponen

(10) Patent No.: US 10,412,140 B2
(45) Date of Patent: Sep. 10, 2019

(54) SENDING OF A STREAM SEGMENT DELETION DIRECTIVE

(71) Applicant: Nokia Technologies Oy, Espoo (FI)

(72) Inventor: Erika Reponen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 71 days.

(21) Appl. No.: 15/113,744

(22) PCT Filed: Jan. 24, 2014

(86) PCT No.: PCT/FI2014/050055
§ 371 (c)(1),
(2) Date: Jul. 22, 2016

(87) PCT Pub. No.: WO2015/110692
PCT Pub. Date: Jul. 30, 2015

(65) Prior Publication Data
US 2017/0013043 A1    Jan. 12, 2017

(51) Int. Cl.
*H04L 29/06* (2006.01)
*H04N 21/41* (2011.01)
(Continued)

(52) U.S. Cl.
CPC .......... *H04L 65/604* (2013.01); *H04L 65/607* (2013.01); *H04N 21/4126* (2013.01);
(Continued)

(58) Field of Classification Search
CPC . H04L 65/604; H04L 65/607; H04N 21/4126; H04N 21/4334
(Continued)

(56) References Cited

U.S. PATENT DOCUMENTS 6,275,618 B1 * 8/2001 Kodama .............. G11B 27/036
                                                348/E5.108
7,522,664 B1 * 4/2009 Bhaskar ............. G01N 21/9501
                                                348/126
(Continued)

FOREIGN PATENT DOCUMENTS

EP    1367824 A2    12/2003
WO    0229510 A2    4/2002
(Continued)

OTHER PUBLICATIONS

International Search Report and Written Opinion received for corresponding Patent Cooperation Treaty Application No. PCT/FI2014/050055, dated Sep. 10, 2014, 10 pages.
(Continued)

*Primary Examiner* — Minh Chau Nguyen
(74) *Attorney, Agent, or Firm* — Mintz Levin Cohn Ferris Glovsky and Popeo, P.C.

(57) ABSTRACT

A method comprising causation of capture of a stream of visual information, sending of at least a portion of the stream of visual information to a separate apparatus, receipt of information indicative of a stream segment deletion input that identifies a segment of the stream of visual information for deletion, and sending of a stream segment deletion directive to the separate apparatus based, at least in part, on the stream segment deletion input is disclosed.

20 Claims, 11 Drawing Sheets

(51) Int. Cl.
　　　*H04N 21/433* (2011.01)
　　　*H04N 21/431* (2011.01)
　　　*H04N 21/414* (2011.01)
　　　*H04N 21/472* (2011.01)
　　　*H04N 21/4722* (2011.01)
　　　*H04N 21/8549* (2011.01)

(52) U.S. Cl.
　　　CPC ... *H04N 21/41407* (2013.01); *H04N 21/4316* (2013.01); *H04N 21/4334* (2013.01); *H04N 21/4722* (2013.01); *H04N 21/47205* (2013.01); *H04N 21/8549* (2013.01)

(58) Field of Classification Search
　　　USPC .................................................. 709/215–217
　　　See application file for complete search history.

(56) References Cited

U.S. PATENT DOCUMENTS

| | | | | |
|---|---|---|---|---|
| 7,778,326 | B1* | 8/2010 | Chen | H04L 47/10 370/468 |
| 8,060,637 | B2* | 11/2011 | Kayanuma | G06F 12/0802 709/219 |
| 9,438,860 | B2* | 9/2016 | Beyabani | H04N 7/163 |
| 2002/0087709 | A1* | 7/2002 | Kerr | H04L 29/06 709/231 |
| 2008/0048975 | A1* | 2/2008 | Leibow | G06F 3/023 345/156 |
| 2008/0101456 | A1* | 5/2008 | Ridge | H04N 5/262 375/240.01 |
| 2009/0010617 | A1* | 1/2009 | Jones | G11B 27/034 386/288 |
| 2014/0136921 | A1* | 5/2014 | Murakami | H03M 13/1154 714/758 |
| 2014/0259046 | A1* | 9/2014 | Ren | H04N 21/4542 725/28 |
| 2015/0244751 | A1* | 8/2015 | Lee | H04N 21/41407 709/219 |

FOREIGN PATENT DOCUMENTS

| | | | |
|---|---|---|---|
| WO | 2012083462 A1 | 6/2012 | |
| WO | WO-2012083462 A1 * | 6/2012 | ......... G06Q 30/0269 |

OTHER PUBLICATIONS

Office action received for corresponding European Patent Application No. 14706313.5, dated Aug. 1, 2017, 6 pages.

* cited by examiner

SENDING OF A STREAM SEGMENT DELETION DIRECTIVE

RELATED APPLICATION

This application was originally filed as Patent Cooperation Treaty Application No. PCT/FI2014/050055 filed Jan. 24, 2014.

TECHNICAL FIELD

The present application relates generally to sending of a stream segment deletion directive.

BACKGROUND

Electronic apparatuses have become a major part of the lives of their users. Many users enjoy utilizing their electronic apparatuses to capture visual information, and to share that visual information with other users. In some circumstances, it may be desirable to allow a user of an electronic apparatus to delete at least a part of the visual information in an easy and intuitive manner.

SUMMARY

Various aspects of examples of the invention are set out in the claims.

One or more embodiments may provide an apparatus, a computer readable medium, a non-transitory computer readable medium, a computer program product, and a method for causation of capture of a stream of visual information, sending of at least a portion of the stream of visual information to a separate apparatus, receipt of information indicative of a stream segment deletion input that identifies a segment of the stream of visual information for deletion, and sending of a stream segment deletion directive to the separate apparatus based, at least in part, on the stream segment deletion input.

One or more embodiments may provide an apparatus, a computer readable medium, a computer program product, and a non-transitory computer readable medium having means for causation of capture of a stream of visual information, means for sending of at least a portion of the stream of visual information to a separate apparatus, means for receipt of information indicative of a stream segment deletion input that identifies a segment of the stream of visual information for deletion, and means for sending of a stream segment deletion directive to the separate apparatus based, at least in part, on the stream segment deletion input.

In at least one example embodiment, the separate apparatus is at least one of a non-private visual information repository or a non-private streaming server.

One or more example embodiments further perform determination of the stream segment deletion directive based, at least in part, on the stream segment deletion input.

One or more example embodiments further perform storage of the stream of visual information such that the stream of information comprises the segment of the stream of visual information.

In at least one example embodiment, the storage of the stream of visual information comprises storage of the stream of visual information in a private visual information repository.

One or more example embodiments further perform storage of a section of the stream of visual information in a visual information buffer, wherein sending the stream of visual information to the separate apparatus comprises retrieval of the section of the stream of visual information from the visual information buffer, and sending of at least part of the section of the stream of visual information to the separate apparatus.

One or more example embodiments further perform identification of a part of the section of the stream of visual information corresponds with a part of the segment of the stream of visual information, and preclusion of sending of the part of the section of the stream of visual information that corresponds with the part of the segment of the stream of visual information.

In at least one example embodiment, the preclusion of sending of the part of the section of the stream of visual information that corresponds with the part of the segment of the stream of visual information comprises sending of the section of the stream of visual information absent the part of the section of the stream of visual information that corresponds with the part of the segment of the stream of visual information.

One or more example embodiments further perform deletion of the part of the section of the stream of visual information that corresponds with the part of the segment of the stream of visual information from the visual information buffer.

In at least one example embodiment, the stream segment deletion directive identifies a different part of the segment that fails to comprise the part of the segment.

In at least one example embodiment, the receipt of the information indicative of the stream segment deletion input is from at least one of a touch sensor, a camera module, a proximity sensor, a rotatable selector sensor, or an orientation sensor.

One or more example embodiments further perform causation of rendering of information indicative of the stream segment deletion input.

In at least one example embodiment, the stream segment deletion input indicates a duration, and the information indicative of the stream segment deletion input indicates the duration.

One or more example embodiments further perform causation of display of the stream of visual information on a display.

In at least one example embodiment, a position of the stream segment deletion input corresponds with a position of display of the stream of visual information on the display.

One or more example embodiments further perform causation of continuation of the capture of the stream of visual information, and sending of at least a portion of the stream of visual information to the separate apparatus.

One or more example embodiments further perform determination of a time of receipt the stream segment deletion input, wherein the segment of the visual information is based, at least in part, on the time of receipt the stream segment deletion input.

In at least one example embodiment, the stream segment deletion input indicates a duration, wherein the segment of the visual information is based, at least in part, on the duration.

One or more example embodiments further perform determination of a time of receipt the stream segment deletion input, wherein the stream segment deletion input indicates a duration and the segment of the visual information is based, at least in part, on the time of receipt the stream segment deletion input and the duration.

In at least one example embodiment, the segment of the stream of visual information is a segment that is bounded by the time of receipt and a time that corresponds with the duration prior to the time of receipt.

In at least one example embodiment, the stream segment deletion input is an input that, at least partially, surrounds a center point such that a duration of the segment of the stream of visual information is identified by way of an angle from the center point.

In at least one example embodiment, the stream segment deletion input increments the duration of the segment of the stream of visual information by one minute per six degrees of rotation about the center point.

In at least one example embodiment, the stream segment deletion input is a drag input, and the stream segment deletion input is received from a touch sensor.

In at least one example embodiment, the stream segment deletion input is a circular gesture input, and the stream segment deletion input is received from at least one of a camera module or a proximity sensor.

In at least one example embodiment, the stream segment deletion input is a drag input, and the stream segment deletion input is received from a touch sensor.

In at least one example embodiment, the stream segment deletion input is a rotation input, and the stream segment deletion input is received from a rotatable selector sensor.

In at least one example embodiment, the stream segment deletion directive comprises information that instructs the separate apparatus to delete the segment of the stream of information.

In at least one example embodiment, the stream segment deletion directive comprises information that instructs the separate apparatus to preclude streaming of the segment of the stream of information.

In at least one example embodiment, the stream segment deletion directive comprises information that instructs the separate apparatus to preclude presentation of the segment of the stream of information.

One or more example embodiments further perform receipt of information indicative of a stream entirety deletion input, wherein the stream segment deletion directive comprises information that instructs the separate apparatus to delete the entirety of the stream of visual information.

One or more example embodiments further perform receipt of information indicative of a stream entirety deletion input, wherein the stream segment deletion directive comprises information that instructs the separate apparatus to preclude streaming of the entirety of the stream of visual information.

One or more example embodiments further perform receipt of information indicative of a stream entirety deletion input, wherein the stream segment deletion directive comprises information that instructs the separate apparatus to preclude presentation of the entirety of the stream of visual information.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
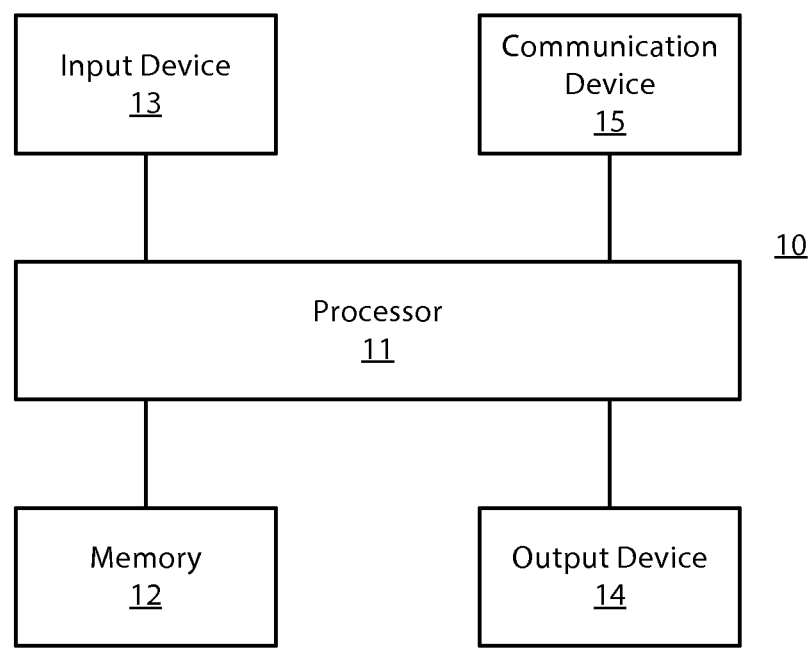
FIG. 1 is a block diagram showing an apparatus according to an example embodiment.

An embodiment of the invention and its potential advantages are understood by referring to FIGS. 1 through 12 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a wearable apparatus, a head mounted display, a near eye display, a wrist worn apparatus, a watch apparatus, a hand worn apparatus, a ring apparatus, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
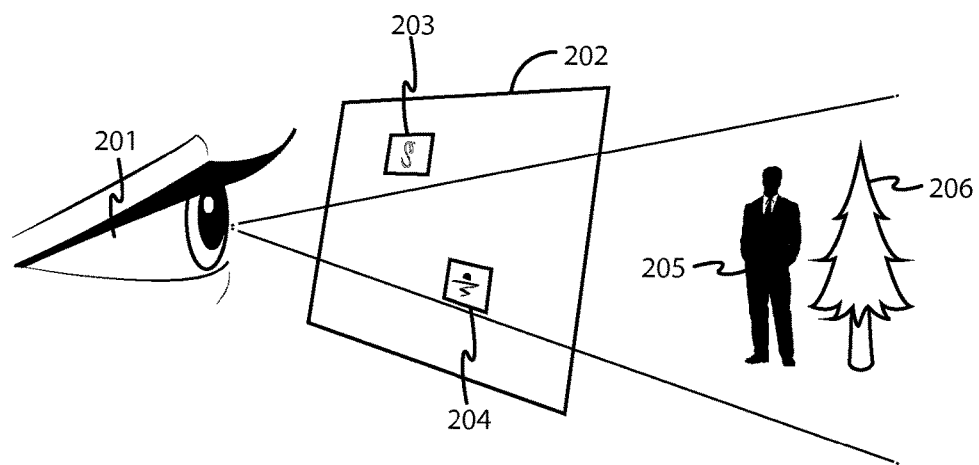
FIGS. 2A-2B are diagrams illustrating see through displays according to at least one example embodiment.
Figure 2B:
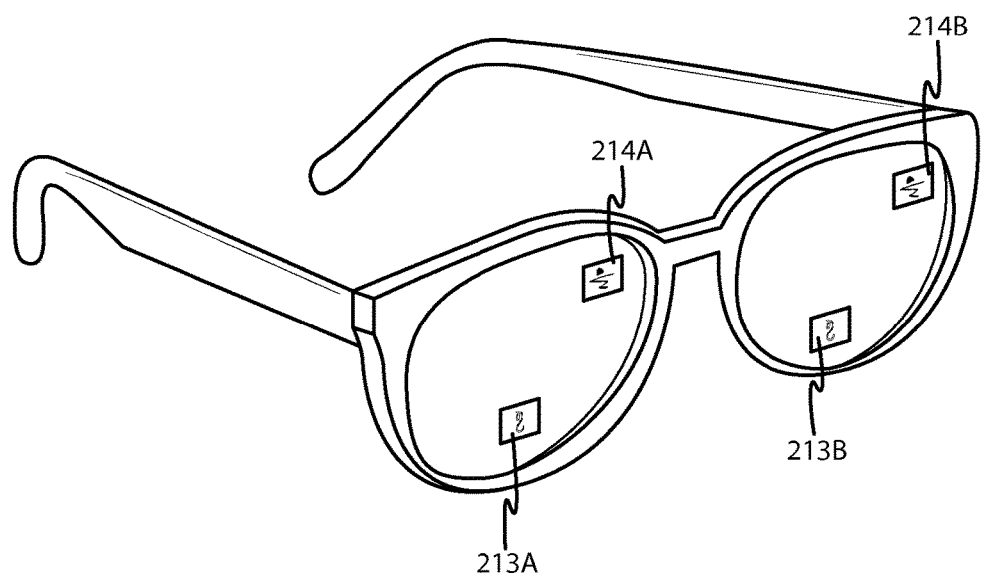

FIGS. 2A-2B are diagrams illustrating see through displays according to at least one example embodiment. The examples of FIGS. 2A-2B are merely examples and do not limit the scope of the claims. For example, configuration of the see through display may vary, relationship between the user and the see through display may vary, shape of the see through display may vary, opacity of the see through display may vary, and/or the like.

In modern times, electronic apparatuses are becoming more prevalent and pervasive. Users often utilize such apparatuses for a variety of purposes. For example, a user may utilize an apparatus to view information that is displayed on a display of the apparatus, to perceive information associated with the user's surroundings on the display of the apparatus, and/or the like. In many circumstances, a user may desire to view information associated with an apparatus in a way that is noninvasive, nonintrusive, discreet, and/or the like. In such circumstances, it may be desirable for a display to be a see through display. In at least one example embodiment, a see through display is a display that presents information to a user, but through which objects on an opposite side of the display from the user may be seen. For example, an object on the opposite side of the display may be perceivable through the see through display. A see through display may be comprised by a window, a windshield, a visor, glasses, a head mounted display, and/or the like. In at least one example embodiment, an apparatus is a head mounted display. A head mounted display may, for example, be a display that is head mountable, a display that is coupled to an element that is wearable at a location on and/or proximate to the head of a user, a display that is wearable at a location on and/or proximate to the head of a user, and/or the like.

FIG. 2A is a diagram illustrating see through display 202 according to at least one example embodiment. In at least one example embodiment, displaying information on a see through display so that the information corresponds with one or more objects viewable through the see through display is referred to as augmented reality. In the example of FIG. 2A, user 201 may perceive objects 205 and 206 through see through display 202. In at least one example embodiment, the see through display may display information to the user. For example, display 202 may display information 203 and information 204. Information 203 and information 204 may be positioned on display 202 such that the information corresponds with one or more objects viewable through see through display 202, such as object 205. For example, information 204 may be displayed at a position on display 202 such that information 204 is aligned with a line of sight between user 201 and object 206. For example, user 201 may perceive information 204 to be overlapping object 206, to partially correspond with object 206 in the user's field of view through display 202, and/or the like. In such an example, information 203 may be associated with, identify, and/or the like, object 205. For example, information 203 may indicate an identity of object 205. In at least one example embodiment, display 202 may be comprised by a head mounted display.

FIG. 2B is a diagram illustrating a see through display according to at least one example embodiment. In at least one example embodiment, a see through display is a near eye display. A near eye display may be a see through display that is positioned proximate to an eye of the user. The example of FIG. 2B illustrates glasses that comprise a near eye display in each lens. In the example of FIG. 2B, the right near eye display is displaying information 213A and 214A, and the left near eye display is displaying information 213B and 214B. In at least one example embodiment, information 213A may be associated with information 213B. For example, the content of information 213A may be identical to content of information 213B. In some circumstances, even though the content may be identical between 213A and 213B, position of information 213A on the right near eye display may vary from position of information 213B on the left near eye display. In this manner, the apparatus may vary position of information between the left near eye display and right near eye display to vary the parallax of the information perceived by the user. In this manner, the apparatus may vary the perceived depth of the information by the user.

Figure 3:
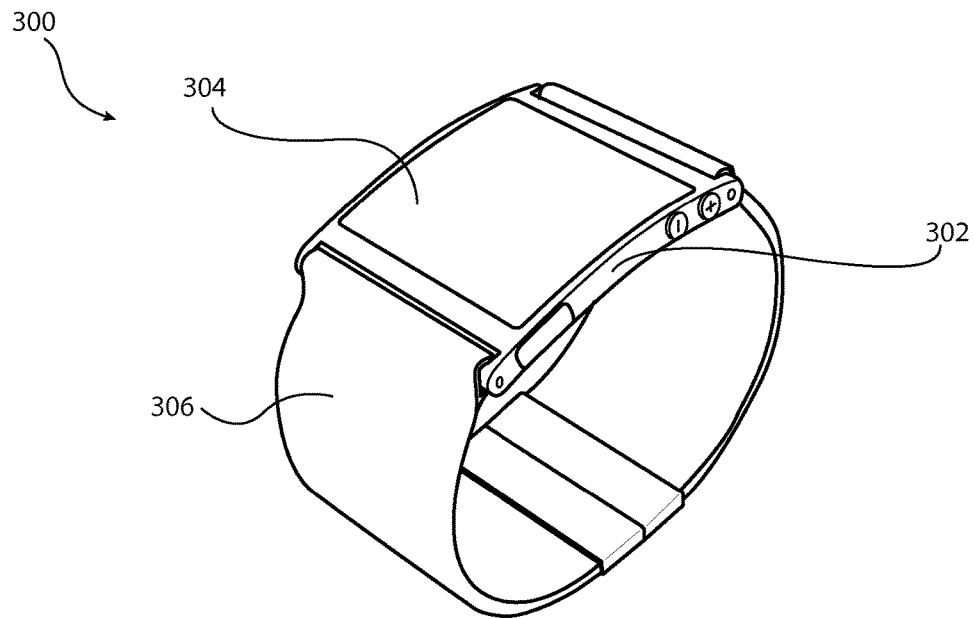
FIG. 3 is a diagram illustrating a wrist worn apparatus according to at least one example embodiment.

FIG. 3 is a diagram illustrating a wrist worn apparatus according to at least one example embodiment. The example of FIG. 3 is merely an example and does not limit the scope of the claims. For example, wrist worn apparatus design may vary, configuration of the wrist worn apparatus may vary, display configuration may vary, and/or the like.

As electronic apparatuses become more prevalent, many users may desire to interact with electronic apparatuses in manners that are intuitive, convenient, accessible, and/or the like. For example, a user may desire to interact with an electronic apparatus that may be unobtrusive to interact with, convenient to interact with, and/or the like. In at least one example embodiment, an apparatus is a wrist worn apparatus. A wrist worn apparatus may be a watch apparatus, a bracelet apparatus, and/or the like. In at least one example embodiment, a wrist worn apparatus comprises a wrist adherence portion. In at least one example embodiment, the wrist adherence portion is a part of the housing of the wrist worn apparatus that is configured to cause the wrist worn apparatus to adhere to a user's wrist, avoid falling from the user's wrist, and/or the like. For example, the wrist adherence portion may be a housing that is configured to at least partially surround a wrist of a wearer of the wrist worn apparatus. In such an example, the wrist adherence portion may be a band, a strap, a bracelet, and/or the like. The wrist adherence portion of the wrist worn apparatus may be rigid, flexible, stretchy, foldable, curvable, deformable, bendable, and/or the like. For example, the wrist adherence portion of the wrist worn apparatus may be a non-curved band that a user can configure such that the non-curved band curves and wraps around the wrist of the user.

In many circumstances, a user may desire to have a wrist worn apparatus to display information. For example, the user may desire the wrist worn apparatus to display information of particular interest to the user, to display visual information that may appeal to the user, and/or the like. In at least one example embodiment, an apparatus comprises a display. The display may be a light emitting diode display, an electronic ink display, a liquid crystal display, an organic light emitting diode display, and/or the like. In at least one example embodiment, a display is coupled with a display housing. In such an example embodiment, the wrist adherence portion of the wrist worn apparatus may be removeably coupled with the display housing, permanently coupled with the display housing, flexibly coupled with the display housing, rigidly coupled with the display housing, and/or the like.

FIG. 3 is a diagram illustrating a wrist worn apparatus according to at least one example embodiment. The example of FIG. 3 depicts wrist worn apparatus 300. In the example of FIG. 3, wrist worn apparatus 300 comprises display housing 302, wrist adherence portion 306, and display 304. As is depicted in FIG. 3, wrist adherence portion 306 is rotatably coupled with display housing 302 on either side of display housing 302. Display 304 is coupled with display housing 302.

In the example of FIG. 3, wrist adherence portion 306 is a strap that adheres wrist worn apparatus 300 to a user's wrist, such that wrist worn apparatus 300 is secured to the user's wrist and does not fall off of the user's wrist. When worn about the wrist of the user, wrist worn apparatus 300 may be oriented such that display 304 faces in a direction that is generally facing the user, such that the user may perceive information displayed on display 304 of wrist worn apparatus 300.

Figure 4:
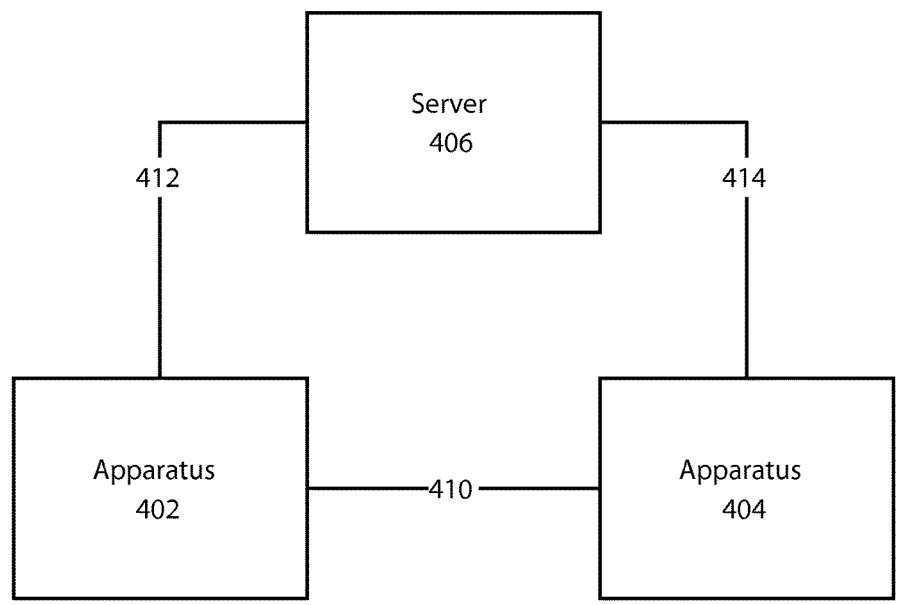
FIG. 4 is a diagram illustrating apparatus communication according to at least one example embodiment.

FIG. 4 is a diagram illustrating apparatus communication according to at least one example embodiment. The example of FIG. 4 illustrates apparatus 402 in communication with server 406 by way of communication channel 412 and apparatus 404 in communication with server 406 by way of communication channel 414. It should be understood that, even though FIG. 4 illustrates communication channel 410 between apparatus 402 and apparatus 404, apparatus 402 and apparatus 404 may communicate indirectly via one or more separate apparatuses. For example, apparatus 402 may indirectly communicate with apparatus 404 via server 406 by way of communication channels 412 and 414, and apparatus 404 may indirectly communicate with apparatus 402 via server 406 by way of communication channels 414 and 412. For example, apparatus 402 may cause sending of information to apparatus 404 by way of communication channel 410, apparatus 402 may receive information from apparatus 404 by way of server 406, server 406 may receive information sent from apparatus 402, and/or the like.

It should be understood that, even though FIG. 4 illustrates a direct connection between apparatus 402 and server 406, and between apparatus 404 and server 406, there may be intermediate apparatuses that facilitate communication between apparatus 402 and server 406, and/or between apparatus 404 and server 406. For example, there may be one or more routers, hubs, switches, gateways, and/or the like, that are utilized in the communication channels between apparatus 402 and server 406, and/or between apparatus 404 and server 406. In addition, there may be other separate apparatuses that apparatus 402, apparatus 404, and/or server 406 are in communication with. For example, apparatus 402, apparatus 404, and/or server 406 may be in communication with a different server, another separate apparatus, and/or the like.

In many circumstances, a user may desire to utilize an electronic apparatus in order to facilitate perception of a specific environment. For example, the user may desire to utilize the electronic apparatus to facilitate perception of visual information associated with the user's surroundings, visual information associated with a specific location, and/or the like. For example, a user riding a bicycle may desire to capture visual information, store visual information that has been captured, and/or the like. In such an example, the user may desire to send the visual information to another user, to share the visual information with friends, to view the visual information at a later time, and/or the like.

In at least one example embodiment, an apparatus causes capture of a stream of visual information. The apparatus may capture the stream of visual information, may cause a separate apparatus to capture the visual information, and/or the like. In at least one example embodiment, the stream of visual information is captured by way of a camera module. The camera module may be comprised by the apparatus, by a separate apparatus, and/or the like. In at least one example embodiment, the apparatus is a head mounted display, and the camera module is a front facing camera module comprised by the head mounted display. In such an example embodiment, the camera module may be oriented such that a capture region of the camera module points in the direction that, at least partially, corresponds with a field of view of the user of the head mounted display. In at least one example embodiment, the capture region of the camera module corresponds with at least a portion of the environment surrounding the camera module that the camera module is configured to capture.

In many circumstances, a user may desire to capture and/or share visual information in near real time. For example, the user may desire to share a continuous stream of visual information caused to be captured by the user's electronic apparatus. In such an example, the stream of visual information may represent a near live stream of visual information, accounting for the various delays associated with capture and communication of the stream of visual information. In at least one example embodiment, the stream of visual information is continually received from a camera module such that the most recently received visual information represents the most current visual information indicative of the portion of the environment within the capture region of the camera module. In such an example, the apparatus may continuously send the stream of visual information received from the camera module to a separate apparatus. For example, the stream of visual information may be a stream of video captured by way of a camera module. As time progresses, visual information may be captured by the camera module and received by the apparatus. The apparatus may cause sending of the received visual information to a separate apparatus for purposes related to sharing of the visual information, storage of the visual information, and/or the like.

As discussed previously, in many circumstances, a user may desire to share a stream of visual information with friends, to send at least a portion of the visual information to another user, and/or the like. For example, a user may desire to share a stream of visual information with one or more social networking friends by way of an Internet-accessible social networking platform. In such an example, the use may desire to capture a stream of visual information and send the stream of visual information to one or more servers associated with the Internet-accessible social networking platform such that the user's friends may access the stream of visual content, stream the visual content, and/or the like. In at least one example embodiment, an apparatus sends at least a portion of the stream of visual information to a separate apparatus. The separate apparatus may be a non-private visual information repository, a non-private streaming server, and/or the like. In at least one example embodiment, a non-private visual information repository is a visual information database, a visual information sharing platform, a social networking platform, and/or the like. In such an example embodiment, the non-private visual information repository may be configured to store the stream of visual information received from the apparatus and/or to communicate the stream of visual information to a separate apparatus, more than one separate apparatuses, a different non-private visual information repository, a non-private streaming server, and/or the like. For example, a user may desire to share a stream of visual information that may be captured by the user's electronic apparatus. In such an example, the user may desire to upload at least a portion of the stream of visual information to a video sharing platform, a social networking website, and/or the like. In at least one example embodiment, a non-private streaming server is a server that is accessible by other authenticated users, by the general public, by friends of the user, by users that have accounts associated with the non-private streaming server, and/or the like. In such an example embodiment, the non-private streaming server may be configured to store the stream of visual information received from the apparatus and/or to communicate the stream of visual information to a separate apparatus, more than one separate apparatuses, a non-private visual information repository, a different non-private streaming server, and/or the like.

In the example of FIG. 4, server 406 may be a non-private visual information repository, a non-private streaming server, and/or the like. Server 406 may receive one or more streams of visual information from apparatus 402 and/or apparatus 404, by way of communication channel 412 and communication channel 414, respectively. For example, apparatus 402 may cause capture of a stream of visual information and may communicate the stream of visual information to server 406 by way of communication channel 412. In such an example, server 406 may be a non-private visual information repository. Server 406 may cause storage of the stream of visual information received from 402, may cause sending of the stream of visual information to apparatus 404, and/or the like.

Figure 5A:
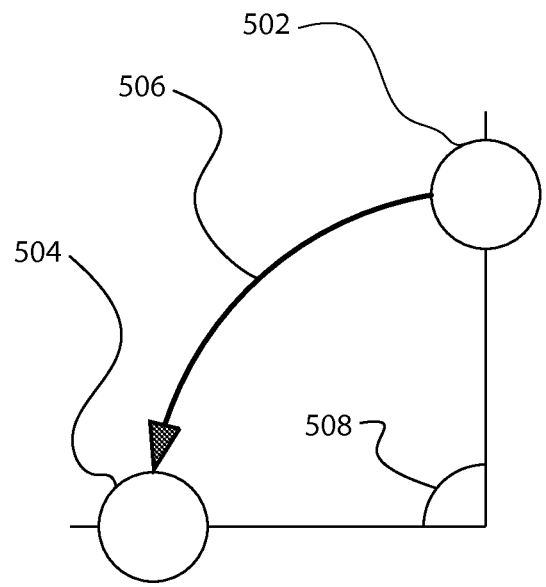
FIGS. 5A-5B are diagrams illustrating stream segment deletion inputs according to at least one example embodiment.
Figure 5B:
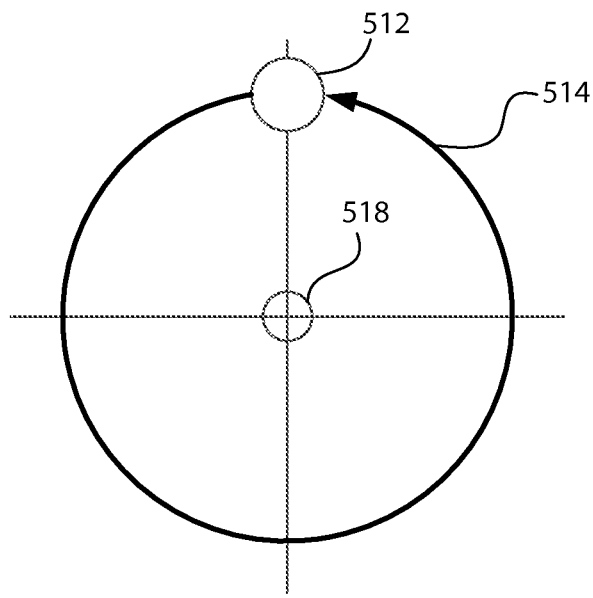

FIGS. 5A-5B are diagrams illustrating stream segment deletion inputs according to at least one example embodiment. The examples of FIGS. 5A-5B are merely examples and do not limit the scope of the claims. For example, stream segment deletion input direction may vary, stream segment deletion input rotation angle may vary, stream segment deletion input shape may vary, and/or the like.

In many circumstances, a user may be actively capturing and/or sharing a stream of visual information. For example, the user may be capturing video while the user may be running in a marathon, biking to work, commuting in a vehicle, talking to a friend, watching a sporting event, and/or the like. In such an example, one or more other users may be viewing the stream of visual information by way of a non-private streaming server, a non-private visual information repository, and/or the like. For example, a friend of the user may be viewing a live stream of the user while the user is participating in her first triathlon. In such an example, the user may desire to share her triathlon experience with her friends, may desire to allow other users to track her progress as she competes in the triathlon, and/or the like.

In some situations, a user may be actively capturing and/or sharing a stream of visual information and may capture visual information that the user does not desire to have sent to a separate apparatus, viewed by another user, and/or the like. For example, it may be desirable to allow a user to easily and intuitively preclude viewing of at least a portion of the stream of visual information by another user, preclude storage of the portion of visual information by a separate apparatus, and/or the like. For example, it may be desirable to permit a user to delete the portion of the stream of visual information prior to communication of the portion of the stream of visual information to the separate apparatus, to cause deletion of the portion of the stream of visual information from the separate apparatus, to preclude further viewing of the portion of the stream of visual information by another user, and/or the like.

In at least one example embodiment, an apparatus receives information indicative of a stream segment deletion input. The stream segment deletion input may identify a segment of the stream of visual information for deletion. For example, a user's apparatus may capture visual information of which the user may desire to preclude sharing. In such an example, the user may indicate such a desire by way of a stream segment deletion input that identifies the segment of the stream of visual information that the user desires to be deleted, unshared, and/or the like. In at least one example embodiment, the stream segment deletion input may be received from a separate apparatus. For example, the apparatus may be the head mounted display illustrated in the example of FIG. 2B. The head mounted display may comprise a camera module, and may capture a stream of visual information. In such an example, the head mounted display may receive a stream segment deletion input from a separate apparatus, such as the wrist worn apparatus illustrated in the example of FIG. 3.

In many circumstances, deletion of the segment of the stream of visual information may be an urgent matter to the user. For example, the user may desire to quickly preclude viewing of the identified segment of the stream of visual information for reasons associated with privacy, confidentiality, and/or the like. In such circumstances, the user may desire to quickly indicate a desire to cause deletion of the segment of the stream of visual information in a simple and intuitive manner. For example, the user may desire to be able to identify and indicate the segment of the stream of visual information while allocating a minimal amount of attention to the act of indicating the segment of the stream of visual information by way of a stream segment deletion input. In this manner, it may be desirable to provide a stream segment deletion input that the user may be able to quickly indicate, indicate without deliberation, and/or the like.

In some circumstances, it may be desirable to configure a stream segment deletion input such that the user may indicate the segment of the stream of the visual information in correspondence with a paradigm that is intuitive to the user. In this manner, such a stream segment deletion input may reduce the amount of time associated with a user contemplating the indication of the stream segment deletion input in order to achieve prompt deletion of the segment of the stream of visual information. In some circumstances, where such contemplation may be associated with the user being delayed from indicating the user's desire to delete the segment of the stream of visual information, such an intuitive stream segment deletion input may increase the likelihood that the user is able to indicate the user's desire to delete the segment of the stream of visual information, preclude further viewing of the segment of the stream of visual information, etc. prior to the segment of the stream of visual information being viewed by another user, sent to a separate apparatus, stored on a separate apparatus, and/or the like.

In at least one example embodiment, a stream segment deletion input corresponds with a temporal representation that allows the user to quickly understand one or more attributes associated with the segment of the stream of visual information that is being identified by the stream segment deletion input. For example, the configuration of the stream segment deletion input may be based, at least in part, on the user's familiarity with an analog clock. In at least one example embodiment, the stream segment deletion input is an input that, at least partially, surrounds a center point such that a duration of the segment of the stream of visual information is identified by way of an angle from the center point. In at least one example embodiment, the center point is a center point in relation to the position and/or radial movement of the stream segment deletion input. For example, the center point may be a geometric center of a shape that the stream segment deletion input, at least partially, circumscribes, such as a focal point. For example, a stream segment deletion input may follow a path of a circle, an oval, an ellipse, a rounded square, and/or the like. In such an example, the center of the stream segment deletion input may be a geometric center of the circle, the oval, the ellipse, the rounded square, and/or the like.

In at least one example embodiment, the stream segment deletion input increments the duration of the segment of the stream of visual information by one second per six degrees of rotation about the center point. In this manner, three hundred sixty degrees of rotation of the stream segment deletion input about the center point may be indicative of one minute. In at least one example embodiment, the stream segment deletion input increments the duration of the segment of the stream of visual information by two seconds per six degrees of rotation about the center point. In this manner, three hundred sixty degrees of travel of the stream segment deletion input about the center point may be indicative of two minutes. In at least one example embodiment, the stream segment deletion input increments the duration of the segment of the stream of visual information by 30 seconds per six degrees of rotation about the center point. In this manner, three hundred sixty degrees of travel of the stream segment deletion input about the center point may be indicative of half an hour. In at least one example embodiment, the stream segment deletion input increments the duration of the segment of the stream of visual information by one minute per six degrees of rotation about the center point. In this manner, three hundred sixty degrees of travel of the stream segment deletion input about the center point may be indicative of one hour.

In some circumstances, a user may desire to quickly and intuitively indicate a desire to delete a segment of a stream of visual information of a predefined length. In at least one example embodiment, three hundred sixty degrees of travel of a stream segment deletion input about a center point identifies a segment of the stream of visual information for deletion to be a segment associated with a predefined duration. The predefined duration may be user definable, predetermined, programmable, and/or the like. For example, a full three hundred and sixty degree stream segment deletion input may identify a 30 second segment of the stream of visual information for deletion. In this manner, a user may make one full revolution stream segment deletion input to delete 30 seconds, another full revolution stream segment input to delete another 30 seconds, and/or the like.

FIG. 5A is a diagram illustrating a stream segment deletion input according to at least one example embodiment. The example of FIG. 5A illustrates a stream segment deletion input that is initiated at start position 502, moves along path 506, and terminates at end position 504. As illustrated, the stream segment deletion input partially circumnavigates a center point of the stream segment deletion input. As indicated in the example of FIG. 5A, the stream segment deletion input is associated with approximately 90 degrees of rotation about the center point, as indicated by angle 508. For example, the stream segment deletion input may increment the duration of the segment of the stream of visual information by one second per six degrees of rotation about the center point. In this manner, angle 508 may indicate that a duration of the segment of the stream visual information is 15 seconds in length. In another example, the stream segment deletion input may increment the duration of the segment of the stream of visual information by one minute per six degrees of rotation about the center point. In this manner, angle 508 may indicate that a duration of the segment of the stream visual information is 15 minutes in length.

FIG. 5B is a diagram illustrating a stream segment deletion input according to at least one example embodiment. The example of FIG. 5B illustrates a stream segment deletion input that is initiated at position 512, moves along path 514, and terminates at position 512. In the example of FIG. 5B, position 512 is the start position of the stream segment deletion input and the end position of the stream segment deletion input. As illustrated, the stream segment deletion input fully circumnavigates a center point of the stream segment deletion input. As indicated in the example of FIG. 5B, the stream segment deletion input is associated with approximately 360 degrees of rotation about the center point, as indicated by angle 518. For example, the stream segment deletion input may increment the duration of the segment of the stream of visual information by one second per six degrees of rotation about the center point. In this manner, angle 518 may indicate that a duration of the segment of the stream visual information is one minute in length. In another example, the stream segment deletion input may increment the duration of the segment of the stream of visual information by one minute per six degrees of rotation about the center point. In this manner, angle 518 may indicate that a duration of the segment of the stream visual information is 60 minutes in length.

The information indicative of the stream segment deletion input may be received from a touch sensor, a camera module, a proximity sensor, a rotatable selector sensor, an orientation sensor, and/or the like. In at least one example embodiment, the stream segment deletion input is received from a touch sensor. In such an example embodiment, the touch sensor may be associated with a display of the apparatus, the separate apparatus, and/or the like. In such an example embodiment, the stream segment deletion input may be a drag input that starts at a start position, moves in a path that at least partially circumnavigates a center point of the stream segment deletion input, and terminates at an end position. For example, the stream segment deletion input illustrated in the example of FIG. 5A may be a drag input in which contact with a touch sensor may be initiated at start position 502, contact may be dragged across the touch sensor in a motion that follows path 506, and in which contact with the touch sensor may be terminated at end position 504.

In at least one example embodiment, the stream segment deletion input is received from a camera module, a proximity sensor, and/or the like. In such an example embodiment, the camera module and/or the proximity sensor may be configured to detect one or more motions, gestures, and/or the like. In such an example embodiment, the stream segment deletion input may be a circular gesture input that starts at a start position, moves in a path that at least partially circumnavigates a center point of the stream segment deletion input, and terminates at an end position. For example, the stream segment deletion input illustrated in the example of FIG. 5A may be a circular gesture input in which the gestures begins at start position 502, moves within a detectable region of the camera module and/or proximity sensor in a motion that follows path 506, and terminates at end position 504.

In at least one example embodiment, the stream segment deletion input is received from a rotatable selector sensor. The rotatable selector sensor may be a rotatable knob, a rotatable dial, and/or the like such that a degree of rotation may be indicated by way of rotating the rotatable selector sensor. In such an example embodiment, the stream segment deletion input may be a rotation input that starts at a start position, rotates about a center point of the rotatable selector sensor, and terminates at an end position. For example, the stream segment deletion input illustrated in the example of FIG. 5B may be a rotation input associated with a rotatable selector sensor in which the rotatable selector sensor beings at position 512, in which the rotatable selector sensor is rotated by angle 518, and in which the rotatable selector sensor ends at position 514. In such an example, the stream segment deletion input is associated with a full rotation of the rotatable selector sensor about a center point, or axis, of the rotatable selector sensor.

In many circumstances, the segment of a stream of video content that the user identifies by way of a stream segment deletion input may have been sent to a separate apparatus, may be stored by a separate apparatus, and/or the like. In order to facilitate the deletion of the segment of the stream of visual information, it may be desirable to communicate the user's desire to delete the segment of the steam of visual information to the separate apparatus. In at least one example embodiment, an apparatus determines a stream segment deletion directive based, at least in part, on a stream segment deletion input. The stream segment deletion directive may, for example, comprise information that instructs the separate apparatus to delete the segment of the stream of information, to preclude streaming of the segment of the stream of information, to preclude presentation of the segment of the stream of information, and/or the like.

In order to facilitate identification of the segment of the stream of visual information that the user desires to have deleted, unshared, etc., it may be desirable to identify a duration of the segment of the stream of visual information from an intuitive reference point. For example, the user may desire to delete the last 30 seconds of the stream of visual information, may desire to preclude further viewing of the last 2 minutes of the stream of visual information, and/or the like. In this manner, the user may quickly and easily delete and/or unshare a segment of the stream of visual information immediately upon recognition of the desire to delete and/or unshare the segment of the stream of visual information. In at least one example embodiment, an apparatus determines a time of receipt of the stream segment deletion input. In such an example embodiment, the segment of the visual information may be based, at least in part, on the time of receipt of the stream segment deletion input. In at least one example embodiment, the stream segment deletion input indicates a duration. In such an example embodiment, the segment of the visual information may be based, at least in part, on the duration.

In many circumstances, an apparatus may identify the segment of the stream of visual information to be a portion of the stream of visual information that extends back for an amount of time indicated by the duration from the time of receipt of the stream segment deletion input. In at least one example embodiment, an apparatus receives information indicative of a stream segment deletion input that indicates a duration, and determines a time of receipt the stream segment deletion input. In such an example embodiment, the segment of the visual information may be based, at least in part, on the time of receipt the stream segment deletion input and the duration. For example, the segment of the stream of visual information may be a segment of the stream of visual information that is bounded by the time of receipt and a time that corresponds with the duration prior to the time of receipt. For example, a user may stream 10 minutes of visual information, and at the 10 minute mark, indicate a desire to delete the most recent 30 seconds of visual information by way of a stream segment deletion input that indicates a 30 second duration. In such an example, the time of receipt of the stream segment deletion input in a time associated with the 10 minute mark of the stream of visual information, and the segment of the stream of visual information is a segment that is between the 9:30 minute mark and the 10 minute mark within the stream of visual information.

In many circumstances, the segment of a stream of video content that the user identifies by way of a stream segment deletion input may have been sent to a separate apparatus, may be stored by a separate apparatus, and/or the like. In order to facilitate the deletion of the segment of the stream of visual information, it may be desirable to communicate the user's desire to delete the segment of the steam of visual information to the separate apparatus. In at least one example embodiment, an apparatus causes sending of a stream segment deletion directive to a separate apparatus based, at least in part, on a stream segment deletion input. The apparatus may send the stream segment deletion directive to the separate apparatus, may send a directive to a different separate apparatus that instructs the different separate apparatus to send the stream segment deletion directive to the separate apparatus, and/or the like.

In some situations, a user may desire to delete the entirety of the stream of visual information rather than only a segment of the stream of visual information. For example, the user may desire to preclude further viewing of the stream of visual information, may desire to remove the stream of visual information for purposes relating to privacy, confidentiality, etc., and/or the like. In such circumstances, it may be desirable to provide a user with an input that is equally easy, quick, and intuitive, such that the user may quickly delete the entirety of the stream of visual information. In at least one example embodiment, an apparatus receives information indicative of a stream entirety deletion input. The stream segment deletion directive may comprise information that instructs a separate apparatus to delete the entirety of the stream of visual information, to preclude streaming of the entirety of the stream of visual information, to preclude presentation of the entirety of the stream of visual information, and/or the like. In such an example embodiment, the stream of visual information is caused to be deleted in its entirety such that no segment of the stream of visual information remains viewable, perceivable, streamable, and/or the like.

Figure 6A:
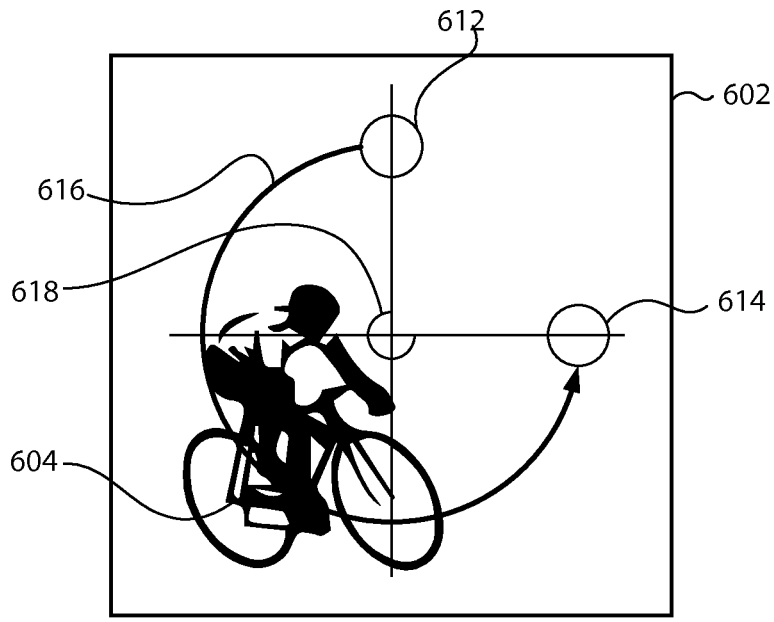
FIGS. 6A-6B are diagrams illustrating stream segment deletion inputs in relation to a stream of visual information according to at least one example embodiment.
Figure 6B:
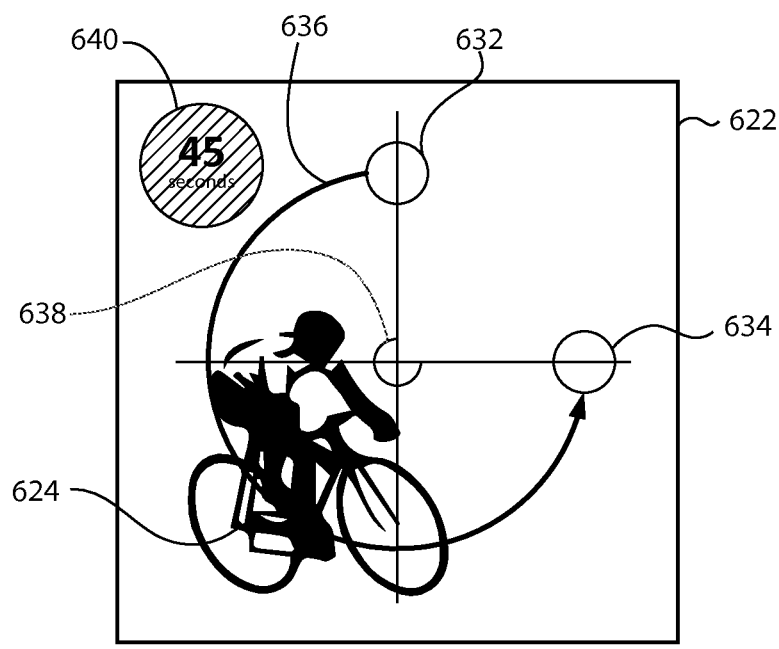

FIGS. 6A-6B are diagrams illustrating stream segment deletion inputs in relation to a stream of visual information according to at least one example embodiment. The examples of FIGS. 6A-6B are merely examples and do not limit the scope of the claims. For example, the stream of visual information may vary, stream segment deletion inputs may vary, rendering of information indicative of the stream segment deletion input may vary, and/or the like.

FIG. 6A is a diagram illustrating a stream segment deletion input in relation to a stream of visual information according to at least one example embodiment. In the example of FIG. 6A, display 602 is displaying visual information 604. Visual information 604 is comprised by a stream of visual information.

In many circumstances, a user may desire to perceive the stream of visual information that the user is streaming to a separate apparatus, sharing with friends, and/or the like. For example, a user may be wearing the head mounted display illustrated in FIG. 2B, and the wrist worn apparatus illustrated in FIG. 3. In such an example, the head mounted display may capture a stream of visual information by way of a camera module and send the stream of visual information to a separate apparatus. In order to facilitate perception of the visual information comprised by the stream of visual information by a user, the user may desire to view the stream of visual information by way of the head mounted display, the wrist worn apparatus, another separate apparatus, and/or the like. In at least one example embodiment, an apparatus causes display of the stream of visual information on a display. The apparatus may display the stream of visual information, send the stream of visual information to a separate apparatus for display, and/or the like. In the example of FIG. 6A, display 602 may, for example, be comprised by the apparatus, a separate apparatus, and/or the like. In at least one example embodiment, display 602 is comprised by a separate apparatus. For example, display 602 may correspond with display 304 of wrist worn apparatus 300 in FIG. 3. In the example of FIG. 6A, visual information 604, comprised by a stream of visual information received from a camera module, is displayed on display 602. In at least one example embodiment, an apparatus comprises a display and a camera module.

In order to allow a user to quickly and intuitively identify a segment of the stream of visual information for deletion, it may be desirable to permit the user to indicate the segment of the stream of visual information in relation to the display of the stream of visual information. For example, the user may perceive via the display a segment of the stream of visual information that the user desires to delete. In such an example, the user may desire to quickly and easily indicate such a desire in order to reduce the likelihood that the segment of the stream of visual information may be viewed prior to deletion. In at least one example embodiment, the position of the stream segment deletion input corresponds with a position of display of the stream of visual information on the display.

For example, FIG. 6A illustrates a stream segment deletion input that is initiated at start position 612, moves along path 616, and terminates at end position 614. In the example of FIG. 6A, the position of the stream segment deletion input corresponds with a position of visual information 604 on display 602. As illustrated, the stream segment deletion input partially circumnavigates a center point of the stream segment deletion input. As indicated in the example of FIG. 6A, the stream segment deletion input is associated with approximately 270 degrees of rotation about the center point, as indicated by angle 618. For example, the stream segment deletion input may increment the duration of the segment of the stream of visual information by one second per six degrees of rotation about the center point. In this manner, angle 618 may indicate that a duration of the segment of the stream visual information is 45 seconds in length. In another example, the stream segment deletion input may increment the duration of the segment of the stream of visual information by one minute per six degrees of rotation about the center point. In this manner, angle 618 may indicate that a duration of the segment of the stream visual information is 45 minutes in length.

In some circumstances, a user may desire to perceive an indication of the duration by way of a display, a speaker, a haptic response, and/or the like. For example, in order to facilitate the indication of precise and accurate durations associated with a stream segment deletion input, it may be desirable to render information indicative of the stream segment deletion input. In at least one example embodiment, an apparatus causes rendering of information indicative of the stream segment deletion input. For example, the stream segment deletion input may indicate a duration, and the information indicative of the stream segment deletion input may indicate the duration. In another example, the stream segment deletion input may indicate a duration, and the information indicative of the stream segment deletion input may be visual information that corresponds with the stream of visual information at a time correspond with the duration from the time of receipt of the stream segment deletion input. In such an example, as a user increments the duration by way of the stream segment deletion input, a display may continually render visual information such that the user may perceive the visual content that the user is identifying for deletion.

FIG. 6B is a diagram illustrating a stream segment deletion input in relation to a stream of visual information according to at least one example embodiment. In the example of FIG. 6B, display 622 is displaying visual information 624. Visual information 624 is comprised by a stream of visual information. In the example of FIG. 6B, display 622 may, for example, be comprised by the apparatus, a separate apparatus, and/or the like. For example, display 622 may correspond with display 304 of wrist worn apparatus 300 in FIG. 3. In the example of FIG. 6B, visual information 624, comprised by a stream of visual information received from a camera module, is displayed on display 622.

The example of FIG. 6B illustrates a stream segment deletion input that is initiated at start position 632, moves along path 636, and terminates at end position 634. In the example of FIG. 6B, the position of the stream segment deletion input corresponds with a position of visual information 624 on display 622. As illustrated, the stream segment deletion input partially circumnavigates a center point of the stream segment deletion input. As indicated in the example of FIG. 6B, the stream segment deletion input is associated with approximately 270 degrees of rotation about the center point, as indicated by angle 638. For example, the stream segment deletion input may increment the duration of the segment of the stream of visual information by one second per six degrees of rotation about the center point. In this manner, angle 638 may indicate that a duration of the segment of the stream visual information is 45 seconds in length. In the example of FIG. 6B, display 622 is displaying indication 640, which is information indicative of the stream segment deletion indication. As can be seen in the example of FIG. 6B, indication 640 indicates that the stream segment deletion input has identified a segment of the stream of visual information that is associated with a duration of 45 seconds.

Figure 7A:
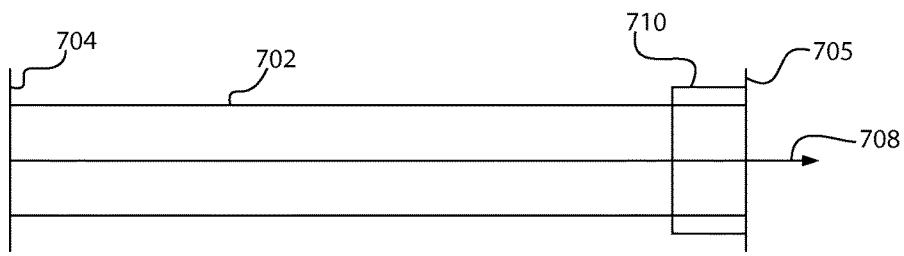
FIGS. 7A-7C are diagrams illustrating a stream of visual information according to at least one example embodiment.
Figure 7B:
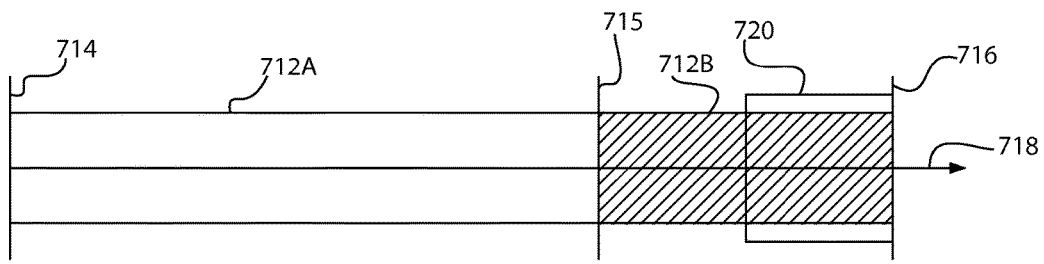
Figure 7C:
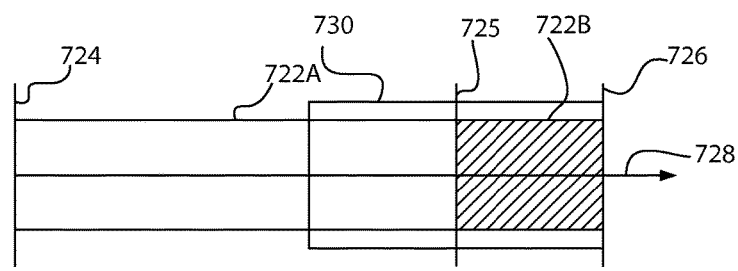

FIGS. 7A-7C are diagrams illustrating a stream of visual information according to at least one example embodiment. The examples of FIGS. 7A-7C are merely examples and do not limit the scope of the claims. For example, streams of visual information configuration may vary, visual information buffer configurations may vary, segments of the stream of visual information may vary, and/or the like.

FIG. 7A is a diagram illustrating a stream of visual information according to at least one example embodiment.

The example of FIG. 7A depicts a stream of visual information in reference to timeline 708. The stream of visual information is bounded by time 704 and time 705. Time 704 may be a time associated with the initiation of capture and/or communication of the stream of visual information, and time 705 may be a time of receipt of a stream segment deletion input that identifies segment 710. In the example of FIG. 7A, segment 710 is a portion of the stream of visual information that has been identified by a user for deletion. In the example of FIG. 7A, the entirety of the stream of visual information, portion 702 of the stream of visual information, may be stored on a separate apparatus, such as a non-private streaming server, a non-private visual information repository, and/or the like. As such, segment 710 identifies a segment of the stream of visual information that is fully comprised by portion 702 of the stream of visual information on the separate apparatus.

In many circumstances, it may be desirable for an apparatus to buffer a stream of visual information prior to sending the stream of visual information to a separate apparatus. For example, a buffer may be utilized for purposes related to error correction, network-related latency, and/or the like. As such, it may be desirable to utilize the buffer in order to increase the likelihood that a segment of the stream of visual information identified by a user by way of a stream segment deletion input may be deleted prior to sending to a separate apparatus, prior to being viewed by another user, and/or the like. For example, a buffer may aggregate a predetermined and revolving portion of the stream of visual information prior to sending the stream of visual information to the separate apparatus. In at least one example embodiment, an apparatus stores a section of the stream of visual information in a visual information buffer. In such an example embodiment, the apparatus may retrieve at least part of the section of the stream of visual information from the visual information buffer, and send the part of the section of the stream of visual information to the separate apparatus.

In many circumstances, it may be desirable to delete a portion of the stream of visual information that is stored in a visual information buffer, to preclude sending of the portion of the stream of visual information that is stored in the visual information buffer, and/or the like. In at least one example embodiment, an apparatus identifies that a part of the section of the stream of visual information corresponds with a part of the segment of the stream of visual information. In such an example embodiment, the apparatus may preclude sending of the part of the section of the stream of visual information that corresponds with the part of the segment of the stream of visual information. For example, the apparatus may preclude sending of the part of the section of the stream of visual information that corresponds with the part of the segment of the stream of visual information, may send the section of the stream of visual information absent the part of the section of the stream of visual information that corresponds with the part of the segment of the stream of visual information, and/or the like. In at least one example embodiment, an apparatus deletes the part of the section of the stream of visual information that corresponds with the part of the segment of the stream of visual information from the visual information buffer.

For example, FIG. 7B depicts a stream of visual information in reference to timeline 718. Portion 712A of the stream of visual information is bounded by time 714 and time 715, and portion 712B of the stream of visual information is bounded by time 715 and time 716. Time 714 may be a time associated with the initiation of capture and/or communication of the stream of visual information, and time 716 may be a time of receipt of a stream segment deletion input that identifies segment 720. In the example of FIG. 7B, segment 720 is a portion of the stream of visual information that has been identified by a user for deletion. In the example of FIG. 7B, portion 712A of the stream of visual information is stored on a separate apparatus, and portion 712B of the stream of visual information is stored in a visual information buffer. In this manner, segment 720 identifies a segment of the stream of visual information that is fully comprised by portion 712B of the stream of visual information in the visual information buffer. As such, segment 720 of the stream of visual information may be precluded from being sent to the separate apparatus, portion 712B of the stream of visual information may be sent to the separate apparatus such that portion 712B of the stream of visual information fails to comprise segment 720, segment 720 may be deleted from the visual information buffer, segment 720 may be deleted from portion 712B of the stream of visual information, and/or the like.

In some circumstances, a segment of a stream of visual information may identify visual information that is partially stored in a visual information buffer and partially by a separate apparatus. For example, a stream segment deletion input may indicate a duration that is greater than the duration of the stream of visual information that is stored in the visual information buffer. In at least one example embodiment, an apparatus identifies that a part of the section of the stream of visual information corresponds with a part of the segment of the stream of visual information. In such an example embodiment, the apparatus may preclude sending of the part of the section of the stream of visual information that corresponds with the part of the segment of the stream of visual information, may delete the part of the section of the stream of visual information that corresponds with the part of the segment of the stream of visual information, and/or the like. In such an example embodiment, a separate apparatus may be associated with a different part of the segment that fails to comprise the part of the segment. In at least one example embodiment, a stream segment deletion directive identifies a different part of the segment that fails to comprise the part of the segment. In such an example embodiment, the apparatus may send the stream segment deletion directive that instructs the separate apparatus to delete the different part of the segment of the stream of visual information.

For example, FIG. 7C depicts a stream of visual information in reference to timeline 728. Portion 722A of the stream of visual information is bounded by time 724 and time 725, and portion 722B of the stream of visual information is bounded by time 725 and time 726. Time 724 may be a time associated with the initiation of capture and/or communication of the stream of visual information, and time 726 may be a time of receipt of a stream segment deletion input that identifies segment 730. In the example of FIG. 7C, segment 730 is a portion of the stream of visual information that has been identified by a user for deletion. In the example of FIG. 7C, portion 722A of the stream of visual information is stored on a separate apparatus, and portion 722B of the stream of visual information is stored in a visual information buffer. In this manner, segment 730 identifies a segment of the stream of visual information that is partially comprised by portion 722A of the stream of visual information on the separate apparatus, and partially comprised by portion 722B of the stream of visual information in the visual information buffer. As such, the part of segment 730 that corresponds with portion 722A may be deleted from the separate apparatus, may be precluded from presentation to another separate apparatus, may be precluded from stream to another separate apparatus, and/or the like. Additionally, the part of segment 730 that corresponds with portion 722B may be precluded from being sent to the separate apparatus, the part of segment 730 that corresponds with portion 722B may be deleted from the visual information buffer, the part of segment 730 that corresponds with portion 722B may be deleted from portion 722B of the stream of visual information, and/or the like.

Figure 8:
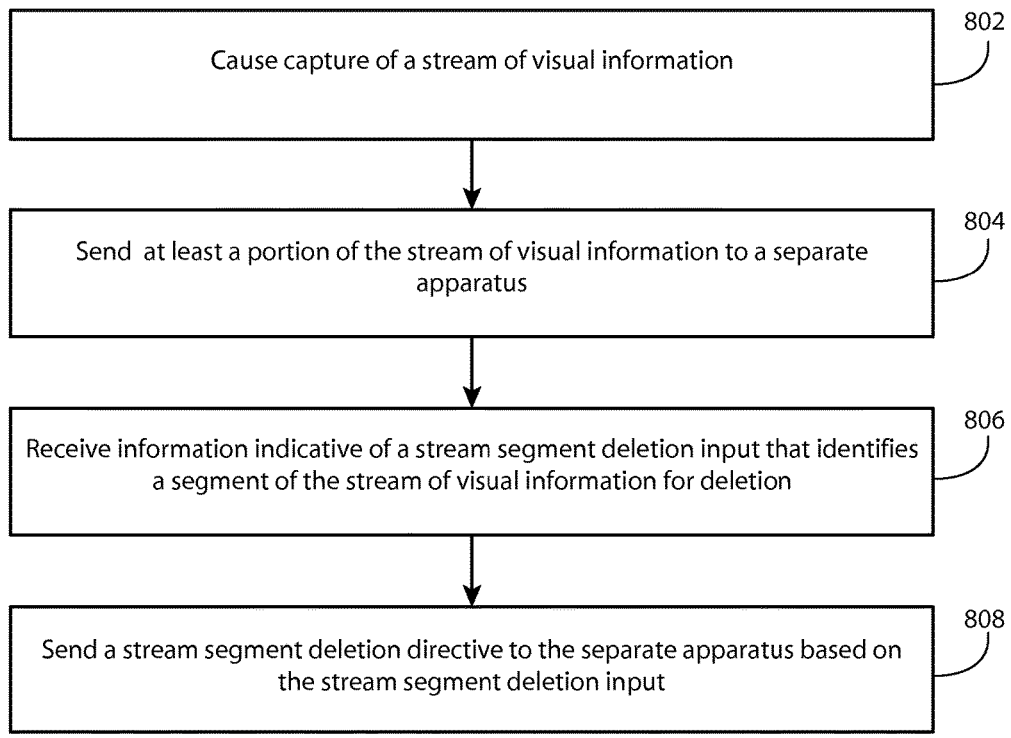
FIG. 8 is a flow diagram illustrating activities associated with sending of a stream segment deletion directive according to at least one example embodiment.

FIG. 8 is a flow diagram illustrating activities associated with sending of a stream segment deletion directive according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

At block 802, the apparatus causes capture of a stream of visual information. The causation, the capture, and the stream of visual information may be similar as described regarding FIGS. 2A-2B, FIG. 3, FIG. 4, FIGS. 6A-6B, and FIGS. 7A-7C.

At block 804, the apparatus sends at least a portion of the stream of visual information to a separate apparatus. The sending, the portion of the stream of visual information, and the separate apparatus may be similar as described regarding FIG. 4, FIGS. 6A-6B, and FIGS. 7A-7C.

At block 806, the apparatus receives information indicative of a stream segment deletion input that identifies a segment of the stream of visual information for deletion. The receipt, the stream segment deletion input, the segment of the stream of visual information, and the identification of the segment of the stream of visual information may be similar as described regarding FIG. 3, FIG. 4, FIGS. 5A-5B, FIGS. 6A-6B, and FIGS. 7A-7C.

At block 808, the apparatus sends a stream segment deletion directive to the separate apparatus based, at least in part, on the stream segment deletion input. The sending and the stream segment deletion directive may be similar as described regarding FIG. 4, FIGS. 5A-5B, FIGS. 6A-6B, and FIGS. 7A-7C.

Figure 9:
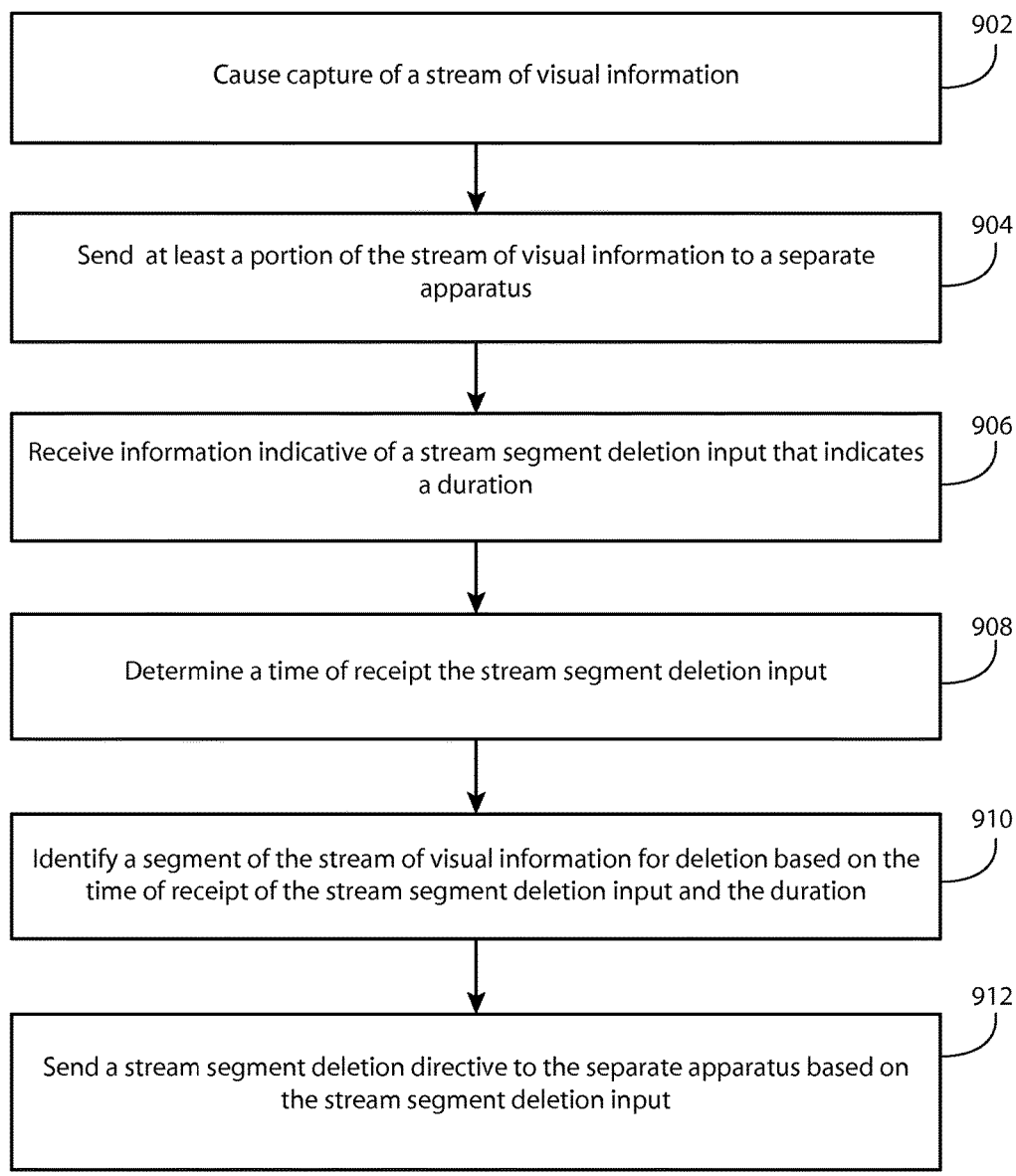
FIG. 9 is a flow diagram illustrating activities associated with sending of a stream segment deletion directive according to at least one example embodiment.

FIG. 9 is a flow diagram illustrating activities associated with sending of a stream segment deletion directive according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As previously discussed, in some circumstances, a user may desire to delete at least a portion of a stream of visual information from the apparatus, a separate apparatus, and/or the like. In many circumstances, it may be desirable to permit a user to identify a duration of the stream of visual information that the user desires to be deleted by way of a stream segment deletion input.

At block 902, the apparatus causes capture of a stream of visual information. The causation, the capture, and the stream of visual information may be similar as described regarding FIGS. 2A-2B, FIG. 3, FIG. 4, FIGS. 6A-6B, and FIGS. 7A-7C.

At block 904, the apparatus sends at least a portion of the stream of visual information to a separate apparatus. The sending, the portion of the stream of visual information, and the separate apparatus may be similar as described regarding FIG. 4, FIGS. 6A-6B, and FIGS. 7A-7C.

At block 906, the apparatus receives information indicative of a stream segment deletion input that indicates a duration. The receipt, the stream segment deletion input, and the duration may be similar as described regarding FIG. 3, FIG. 4, FIGS. 5A-5B, FIGS. 6A-6B, and FIGS. 7A-7C.

At block 908, the apparatus determines a time of receipt of the stream segment deletion input. The determination and the time of receipt may be similar as described regarding FIG. 4, FIGS. 5A-5B, FIGS. 6A-6B, and FIGS. 7A-7C.

At block 910, the apparatus identifies a segment of the stream of visual information for deletion based, at least in part, on the time of receipt of the stream segment deletion input and the duration. The segment of the stream of visual information and the identification of the segment of the stream of visual information may be similar as described regarding FIG. 4, FIGS. 5A-5B, FIGS. 6A-6B, and FIGS. 7A-7C.

At block 912, the apparatus sends a stream segment deletion directive to the separate apparatus based, at least in part, on the stream segment deletion input. The sending and the stream segment deletion directive may be similar as described regarding FIG. 4, FIGS. 5A-5B, FIGS. 6A-6B, and FIGS. 7A-7C.

Figure 10:
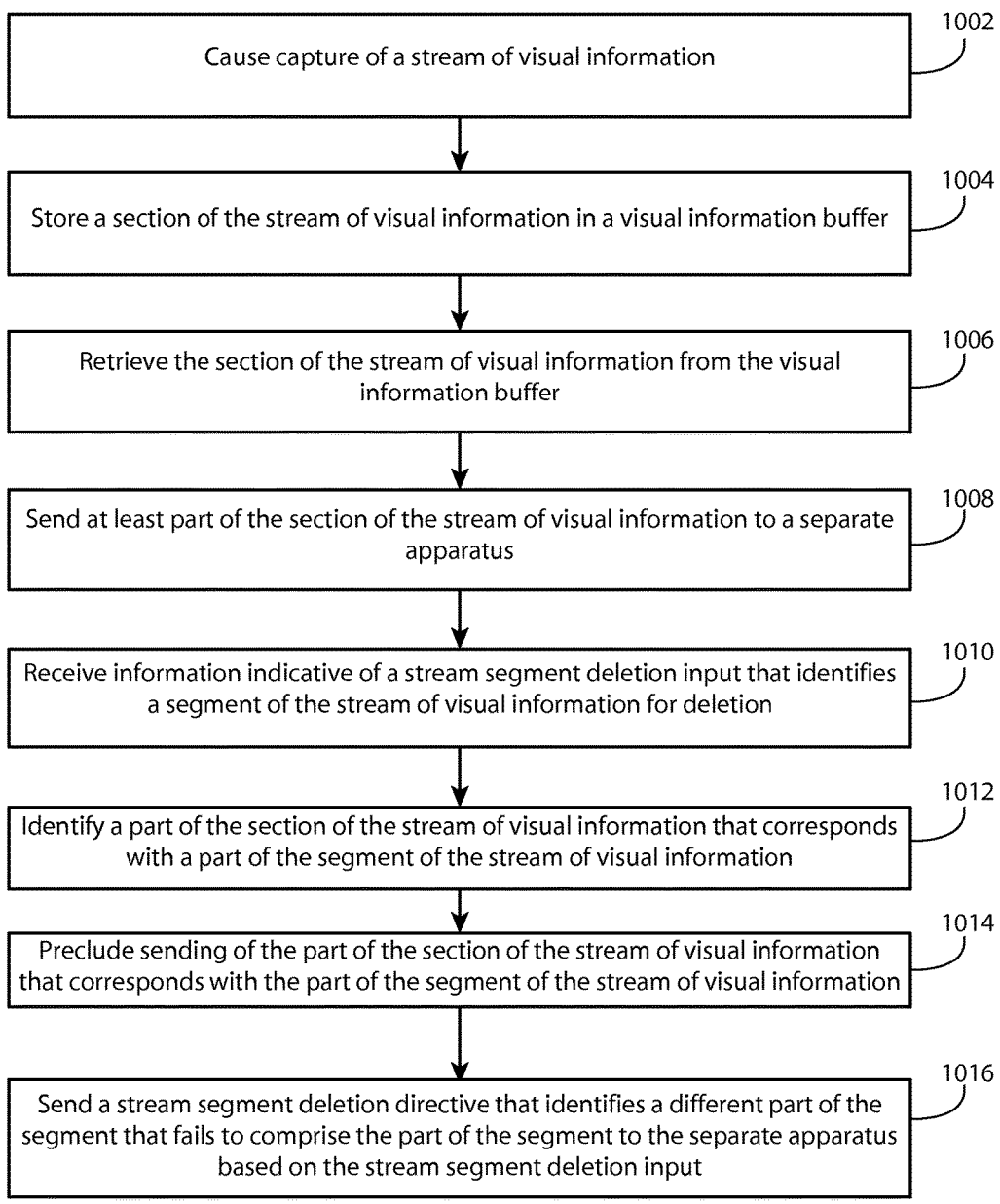
FIG. 10 is a flow diagram illustrating activities associated with sending of a stream segment deletion directive according to at least one example embodiment.

FIG. 10 is a flow diagram illustrating activities associated with sending of a stream segment deletion directive according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As previously discussed, in many circumstances, a stream of visual information may be stored at more than one location, in more than one form, via more than one apparatus, and/or the like. For example, a portion of the stream of visual information may be stored in a visual information buffer, and another portion of the stream of visual information may be stored by a separate apparatus. In such circumstances, a user may desire to delete a part of the stream of visual information that corresponds, at least in part, with the portion of the stream of visual information stored in the visual information buffer and the other portion of the stream of visual information stored by the separate apparatus. In such circumstances, it may be desirable to preclude sending the portion of the stream of visual information stored in the visual information buffer, cause deletion of the other portion of the stream of visual information stored by the separate apparatus, and/or the like.

At block 1002, the apparatus causes capture of a stream of visual information. The causation, the capture, and the stream of visual information may be similar as described regarding FIGS. 2A-2B, FIG. 3, FIG. 4, FIGS. 6A-6B, and FIGS. 7A-7C.

At block 1004, the apparatus stores a section of the stream of visual information in a visual information buffer. The storage, the section of the stream of visual information, and the visual information buffer may be similar as described regarding FIG. 4, FIGS. 5A-5B, FIGS. 6A-6B, and FIGS. 7A-7C.

At block 1006, the apparatus retrieves the section of the stream of visual information from the visual information buffer. The retrieval of the section of the stream of visual information may be similar as described regarding FIG. 4, FIGS. 5A-5B, FIGS. 6A-6B, and FIGS. 7A-7C.

At block 1008, the apparatus sends at least part of the section of the stream of visual information to a separate apparatus. The sending, the part of the section of the stream of visual information, and the separate apparatus may be similar as described regarding FIG. 4, FIGS. 5A-5B, FIGS. 6A-6B, and FIGS. 7A-7C.

At block 1010, the apparatus receives information indicative of a stream segment deletion input that identifies a segment of the stream of visual information for deletion. The receipt, the stream segment deletion input, the segment of the stream of visual information, and the identification of the segment of the stream of visual information may be similar as described regarding FIG. 3, FIG. 4, FIGS. 5A-5B, FIGS. 6A-6B, and FIGS. 7A-7C.

At block 1012, the apparatus identifies a part of the section of the stream of visual information that corresponds with a part of the segment of the stream of visual information. The identification, the part of the section of the stream of visual information, and the part of the segment of the stream of visual information may be similar as described regarding FIG. 4, FIGS. 5A-5B, FIGS. 6A-6B, and FIGS. 7A-7C.

At block 1014, the apparatus precludes sending of the part of the section of the stream of visual information that corresponds with the part of the segment of the stream of visual information. The preclusion of sending of the part of the section of the stream of visual information may be similar as described regarding FIG. 4, FIGS. 5A-5B, FIGS. 6A-6B, and FIGS. 7A-7C.

At block 1016, the apparatus sends a stream segment deletion directive that identifies a different part of the segment that fails to comprise the part of the segment to the separate apparatus based, at least in part, on the stream segment deletion input. The sending, the stream segment deletion directive, the identification, and the different part of the segment may be similar as described regarding FIG. 4, FIGS. 5A-5B, FIGS. 6A-6B, and FIGS. 7A-7C.

Figure 11:
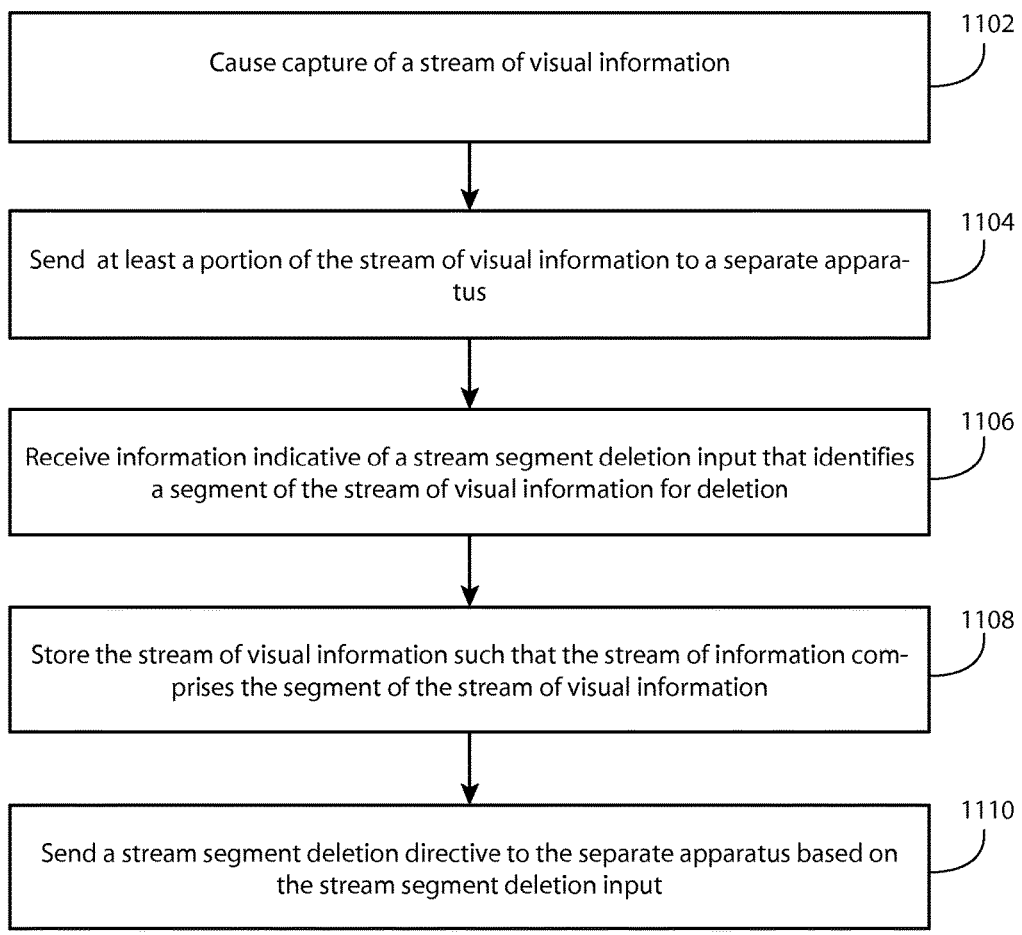
FIG. 11 is a flow diagram illustrating activities associated with sending of a stream segment deletion directive according to at least one example embodiment.

FIG. 11 is a flow diagram illustrating activities associated with sending of a stream segment deletion directive according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

In many circumstances, a user may desire to retain a copy of the stream of visual information in storage notwithstanding deletion of one or more segments of a stream of visual information. For example, although the user may desire to preclude sending of at least a portion of the stream of visual information to a separate apparatus and/or preclude viewing of the portion of the stream of visual information by a third party, the user may nonetheless desire to keep the stream of visual information in its entirety for private viewing, personal reasons, and/or the like. In at least one example embodiment, an apparatus stores the stream of visual information such that the stream of information comprises the segment of the stream of visual information. For example, the apparatus may store the stream of visual information in a private visual information repository, in at least at least one memory comprised by the apparatus, and/or the like.

At block 1102, the apparatus causes capture of a stream of visual information. The causation, the capture, and the stream of visual information may be similar as described regarding FIGS. 2A-2B, FIG. 3, FIG. 4, FIGS. 6A-6B, and FIGS. 7A-7C.

At block 1104, the apparatus sends at least a portion of the stream of visual information to a separate apparatus. The sending, the portion of the stream of visual information, and the separate apparatus may be similar as described regarding FIG. 4, FIGS. 6A-6B, and FIGS. 7A-7C.

At block 1106, the apparatus receives information indicative of a stream segment deletion input that identifies a segment of the stream of visual information for deletion. The receipt, the stream segment deletion input, the segment of the stream of visual information, and the identification of the segment of the stream of visual information may be similar as described regarding FIG. 3, FIG. 4, FIGS. 5A-5B, FIGS. 6A-6B, and FIGS. 7A-7C.

At block 1108, the apparatus stores the stream of visual information such that the stream of information comprises the segment of the stream of visual information.

At block 1110, the apparatus sends a stream segment deletion directive to the separate apparatus based, at least in part, on the stream segment deletion input. The sending and the stream segment deletion directive may be similar as described regarding FIG. 4, FIGS. 5A-5B, FIGS. 6A-6B, and FIGS. 7A-7C.

Figure 12:
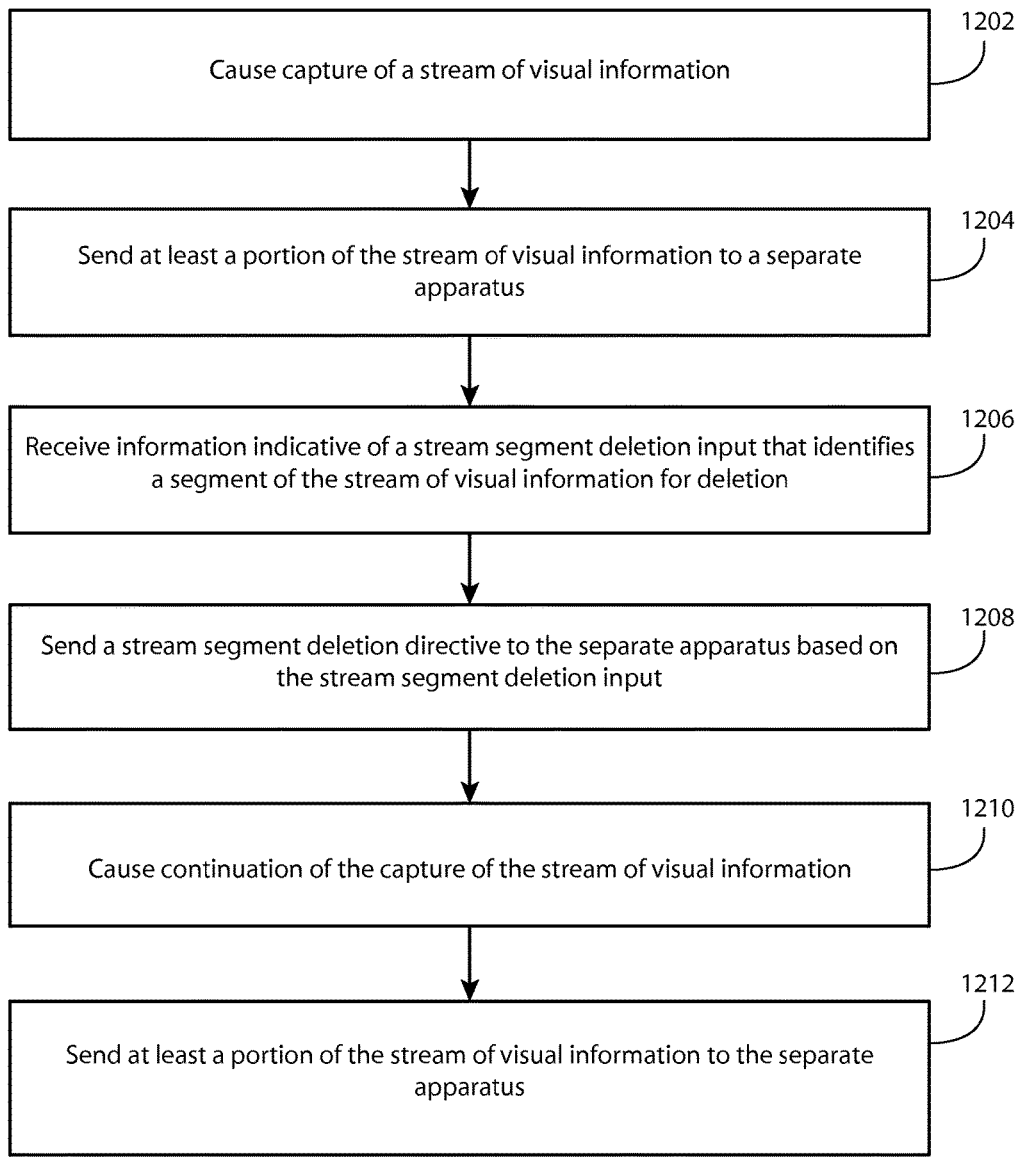
FIG. 12 is a flow diagram illustrating activities associated with sending of a stream segment deletion directive according to at least one example embodiment.

FIG. 12 is a flow diagram illustrating activities associated with sending of a stream segment deletion directive according to at least one example embodiment. In at least one example embodiment, there is a set of operations that corresponds with the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

In many circumstances, a user may desire to continue capture and/or streaming of visual information notwithstanding deletion of one or more segments of a stream of visual information. For example, the user may desire to delete a segment of a stream of visual information for purposes relating to privacy, but may desire to continue streaming subsequent to performance of the stream segment deletion input and deletion of the identified segment of the stream of visual information. In at least one example embodiment, an apparatus causes continuation of the capture of the stream of visual information. In such an example embodiment, the apparatus may continue sending of at least a portion of the stream of visual information to the separate apparatus subsequent to receipt of the stream segment deletion input, the sending of the stream segment deletion directive, and/or the like.

At block 1202, the apparatus causes capture of a stream of visual information. The causation, the capture, and the stream of visual information may be similar as described regarding FIGS. 2A-2B, FIG. 3, FIG. 4, FIGS. 6A-6B, and FIGS. 7A-7C.

At block 1204, the apparatus sends at least a portion of the stream of visual information to a separate apparatus. The sending, the portion of the stream of visual information, and the separate apparatus may be similar as described regarding FIG. 4, FIGS. 6A-6B, and FIGS. 7A-7C.

At block 1206, the apparatus receives information indicative of a stream segment deletion input that identifies a segment of the stream of visual information for deletion. The receipt, the stream segment deletion input, the segment of the stream of visual information, and the identification of the segment of the stream of visual information may be similar as described regarding FIG. 3, FIG. 4, FIGS. 5A-5B, FIGS. 6A-6B, and FIGS. 7A-7C.

At block 1208, the apparatus sends a stream segment deletion directive to the separate apparatus based, at least in part, on the stream segment deletion input. The sending and the stream segment deletion directive may be similar as described regarding FIG. 4, FIGS. 5A-5B, FIGS. 6A-6B, and FIGS. 7A-7C.

At block 1210, the apparatus causes continuation of capture of the stream of visual information.

At block 1212, the apparatus sends at least a portion of the stream of visual information to the separate apparatus. The sending and the portion of the stream of visual information may be similar as described regarding FIG. 4, FIGS. 6A-6B, and FIGS. 7A-7C.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 1108 of FIG. 11 may be performed after block 1110. Furthermore, if desired, one or more of the above-described functions may be optional or may be combined. For example, block 908 of FIG. 9 may be optional and/or combined with block 906 of FIG. 9.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
    at least one processor;
    at least one memory including computer program code, which when executed by the at least one processor, causes the apparatus to at least:
        capture a stream of visual information;
        send, to a separate apparatus, a first portion of the stream of visual information;
        receive a stream segment deletion input indicating a duration of a segment of the stream of visual information;
        identify, based at least on a time of receipt associated with the stream segment deletion input and the duration of the segment of the stream of visual information, the segment of the stream of visual information for deletion; and
        in response to a determination that the first portion includes the identified segment of the stream of visual information, prevent the identified segment from being displayed at the separate apparatus by at least sending, to the separate apparatus, a stream segment deletion directive to at least cause the separate apparatus to delete the first portion of the stream of visual information prior to displaying the segment at the separate apparatus.

2. The apparatus of claim 1, wherein the apparatus is further caused to at least:
    store, in a buffer at the apparatus, a second portion of the stream of visual information, the second portion of the stream of visual information being stored in the buffer prior to being sent to the separate apparatus; and
    in response to a determination that the second portion includes the identified segment of the stream of visual information, delete, from the buffer, the second portion of the stream of visual information.

3. The apparatus of claim 2, wherein the second portion of the stream of visual information is deleted from the buffer to at least prevent the second portion of the stream of visual information from being sent to and/or viewed at the separate apparatus.

4. The apparatus of claim 2, wherein the apparatus is further caused to at least:
    capture a third portion of the stream of visual information; and
    send, to the separate apparatus, the third portion of the stream of visual information, the third portion of the stream of visual information sent to the separate apparatus with and/or without storing the third portion of the stream of visual information in the buffer.

5. The apparatus of claim 1, wherein the first portion of the stream of visual information is stored at the separate apparatus prior to being displayed at the separate apparatus for viewing.

6. The apparatus of claim 1, wherein the apparatus is further caused to at least determine the time of receipt of the stream segment deletion input.

7. The apparatus of claim 1, wherein the stream segment deletion input indicates the duration of the segment based at least on an angle relative to a center point.

8. The apparatus of claim 1, wherein the apparatus is further caused to at least:
    receive a stream entirety deletion input; and
    in response to receiving the stream entirety deletion input, send, to the separate apparatus, the stream segment deletion directive to instruct the separate apparatus to delete the entirety of the stream of visual information.

9. The apparatus of claim 1, wherein the separate apparatus displays the first portion of the stream of visual information in response to being sent the first portion of the stream of visual information.

10. A method comprising:
    capturing, at a first apparatus, a stream of visual information;
    sending, to a second apparatus, a first portion of the stream of visual information;
    receiving a stream segment deletion input indicating a duration of a segment of the stream of visual information;
    identify, based at least on a time of receipt associated with the stream segment deletion input and the duration of the segment of the stream of visual information, the segment of the stream of visual information for deletion a segment of the stream of visual information for deletion; and
    in response to a determination that the first portion includes the identified segment of the stream of visual information, preventing the identified segment from being displayed at the second apparatus by at least sending, to the second apparatus, a stream segment deletion directive to at least cause the separate apparatus to delete the first portion of the stream of visual information prior to displaying the segment at the second apparatus.

11. The method of claim 10, further comprising:
    storing, in a buffer at the first apparatus, a second portion of the stream of visual information, the second portion of the stream of visual information being stored in the buffer prior to being sent to the second apparatus; and
    in response to a determination that the second portion includes the identified segment of the stream of visual information, deleting, from the buffer, the second portion of the stream of visual information.

12. The method of claim 11, wherein the second portion of the stream of visual information is deleted from the buffer to at least prevent the second portion of the stream of visual information from being sent to and/or viewed at the second apparatus.

13. The method of claim 11, further comprising:
    capturing a third portion of the stream of visual information; and
    sending, to the second apparatus, the third portion of the stream of visual information, the third portion of the stream of visual information sent to the second apparatus with and/or without storing the third portion of the stream of visual information in the buffer.

14. The method of claim 10, wherein the second portion of the stream of visual information is stored at the second apparatus prior to being displayed at the second apparatus for viewing.

15. The method of claim 10, further comprising:
    determining the time of receipt of the stream segment deletion input.

16. The method of claim 10, wherein the stream segment deletion input indicates the duration of the segment based at least on an angle relative to a center point.

17. At least one non-transitory computer-readable medium encoded with instructions that, when executed by a processor, result in operations comprising:
   capturing, at a first apparatus, a stream of visual information;
   sending, to a second apparatus, a first portion of the stream of visual information;
   receiving a stream segment deletion input indicating a duration of a segment of the stream of visual information;
   identifying, based at least on a time of receipt associated with the stream segment deletion input and the duration of the segment of the stream of visual information, the segment of the stream of visual information for deletion; and
   in response to a determination that the first portion includes the identified segment of the stream of visual information, preventing the identified segment from being displayed at the second apparatus by at least sending, to the second apparatus, a stream segment deletion directive to at least cause the separate apparatus to delete the first portion of the stream of visual information prior to displaying the segment at the second apparatus.

18. The computer-readable medium of claim 17, further comprising:
   storing, in a buffer at the first apparatus, a second portion of the stream of visual information, the second portion of the stream of visual information being stored in the buffer prior to being sent to the second apparatus; and
   in response to a determination that the second portion includes the identified segment of the stream of visual information, deleting, from the buffer, the second portion of the stream of visual information.

19. The computer-readable medium of claim 18, wherein the first portion of the stream of visual information is deleted from the buffer to at least prevent the first portion of the stream of visual information from being sent to and/or viewed at the second apparatus.

20. The computer-readable medium of claim 17, further comprising:
   determining the time of receipt of the stream segment deletion input.

* * * * *